United States Patent
Taniguchi

Patent Number: 5,903,967
Date of Patent: May 18, 1999

[54] DOUBLE CYLINDER BODY AND A MANUFACTURING METHOD THEREOF

[75] Inventor: Hiroshi Taniguchi, Ohmamamachi, Japan

[73] Assignee: Mitsuba Corporation, Gunma, Japan

[21] Appl. No.: 08/891,443

[22] Filed: Jul. 10, 1997

Related U.S. Application Data

[62] Division of application No. 08/317,829, Oct. 4, 1994, abandoned.

[30] Foreign Application Priority Data

Oct. 12, 1993 [JP] Japan ................................. 5-279006

[51] Int. Cl.$^6$ ........................................... B21D 39/00
[52] U.S. Cl. ............................. 29/516; 29/505; 29/521; 29/523
[58] Field of Search .................... 29/516, 523, 505, 29/888.061, 521, 522.1, 507, 508, 519

[56] References Cited

U.S. PATENT DOCUMENTS

| | | | |
|---|---|---|---|
| 655,304 | 8/1900 | Midgley | 138/151 |
| 904,189 | 11/1908 | Everson | 29/523 |
| 1,464,350 | 8/1923 | Cable | 138/151 |
| 1,646,371 | 10/1927 | Shoemaker | 29/505 X |
| 2,132,565 | 10/1938 | Graham | 29/523 X |
| 2,288,340 | 6/1942 | Yates | 29/505 X |
| 2,693,026 | 11/1954 | Simpleaar | 29/516 |
| 3,571,907 | 3/1971 | Watson | 29/523 X |
| 3,863,328 | 2/1975 | Arntz | 29/516 |
| 4,907,626 | 3/1990 | Mori | 138/166 |
| 5,201,111 | 4/1993 | Prohaska | 310/154 |
| 5,216,306 | 6/1993 | Nakazawa et al. | 310/89 |

FOREIGN PATENT DOCUMENTS

| | | | |
|---|---|---|---|
| 4116-370 | 9/1979 | Japan | 29/516 |
| 57-165139 | 10/1982 | Japan | 29/516 |

*Primary Examiner*—Joseph M. Gorski
*Attorney, Agent, or Firm*—McCormick, Paulding & Huber

[57] ABSTRACT

It is an object of the invention to provide a double cylinder body and a manufacturing method thereof which can connect the inside cylinder and the outside cylinder strongly. The stopper 45 is protrudely provided on the outer circumference of one end portion of the inside cylinder 43 which will be a base of the yoke 13 made from iron, the inside cylinder 43 is attached on the outer circumference of the punch 33 on which the swelling portion 34 is fitted. The punch 33 to which the inside cylinder 43 is fitted is press inserted in the void 42 of the outside cylinder 41 from the swelling portion 34 side. The outside cylinder 41 in which the punch 33 and the inside cylinder 43 are press inserted is press inserted in the die 31. The punch 33 is only ejected from the inside cylinder 43 during ironing the inside face of the inside cylinder 43. Since the inside cylinder 43 is elongated in the circumferential direction thereof by the ironing of the swelling portion 34, the inside cylinder 43 is press contacted on the inner circumferential face of the outside cylinder 41, it is possible to manufacture the motor housing 10 in which the casing 11 made from aluminum and the yoke 13 made from iron are connected to each other strongly.

7 Claims, 4 Drawing Sheets

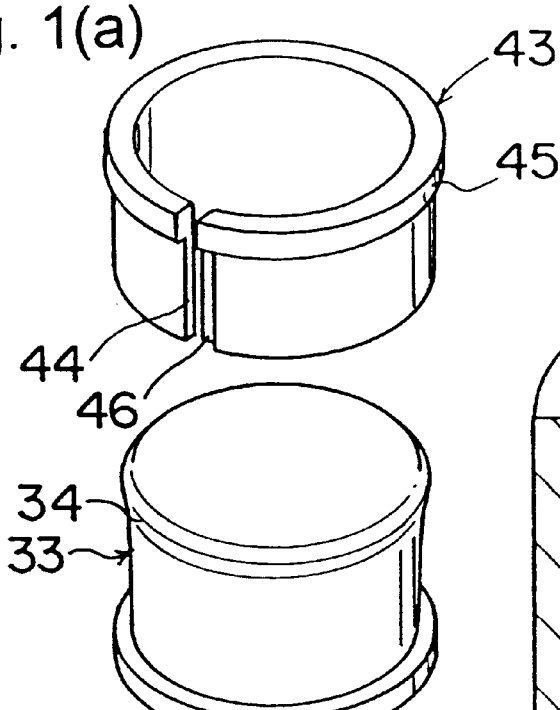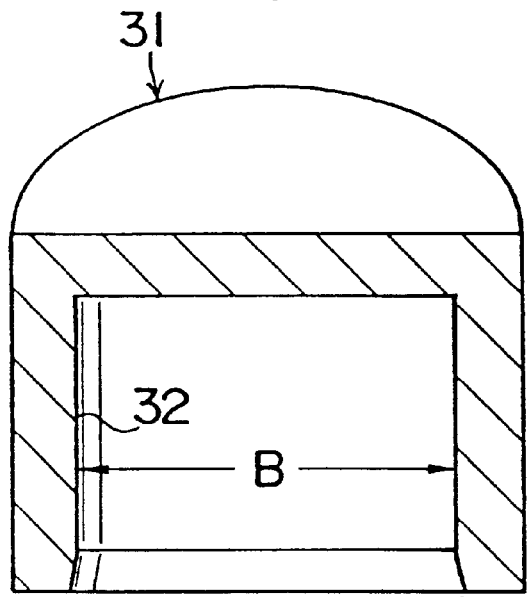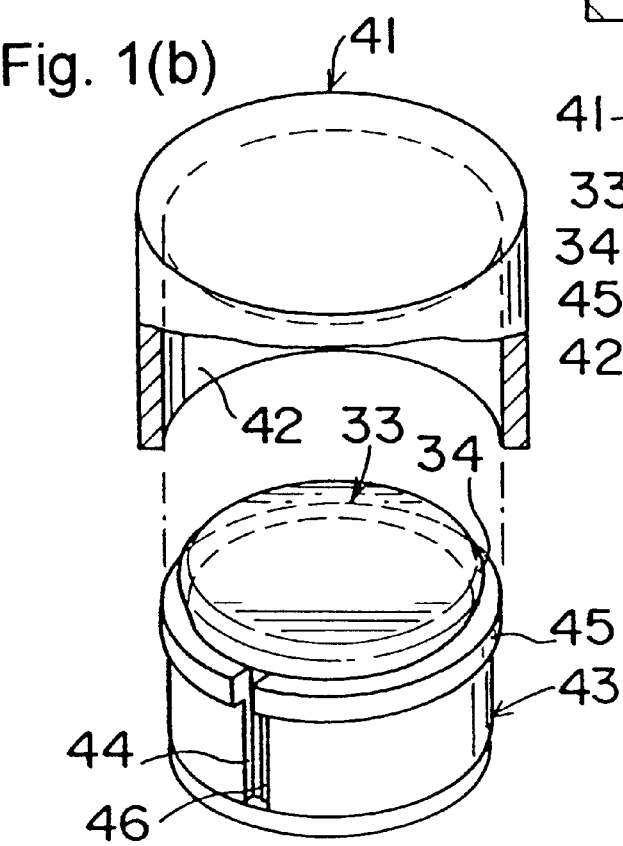

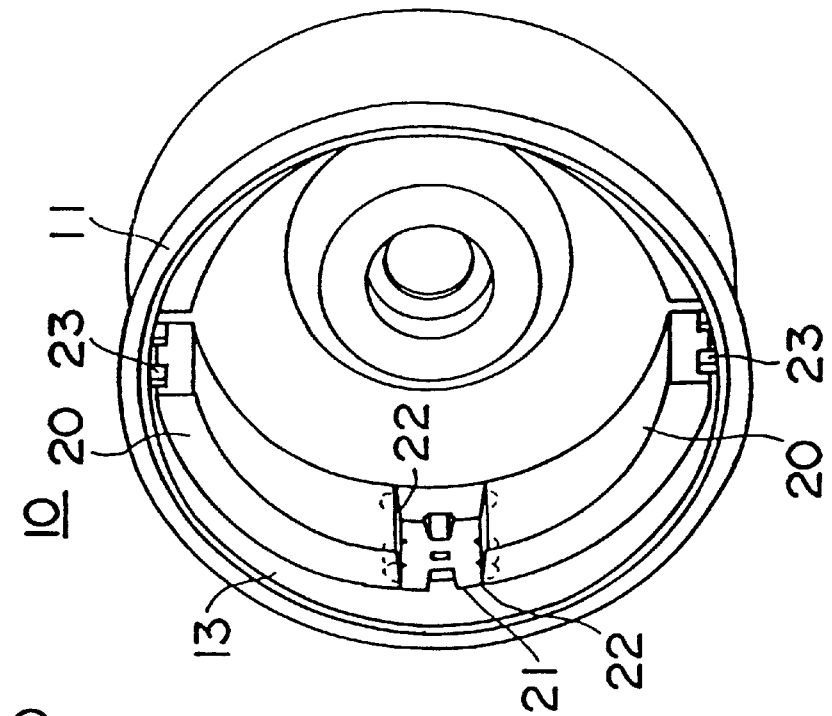
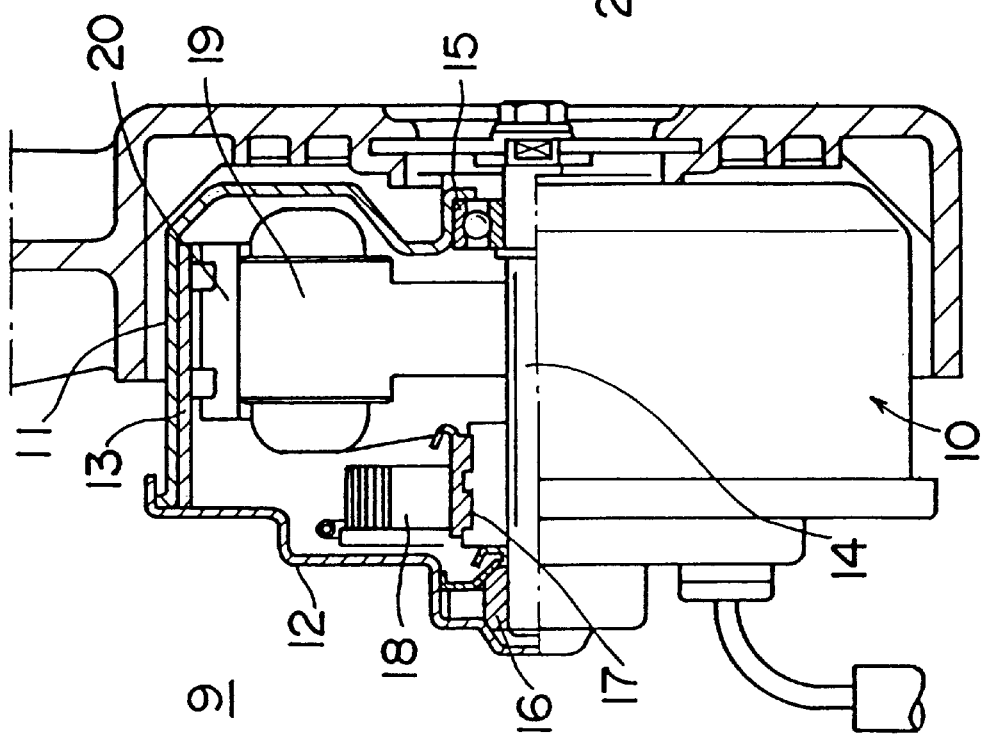

DOUBLE CYLINDER BODY AND A MANUFACTURING METHOD THEREOF

This is a divisional of application Ser. No. 08/317,829 filed on Oct. 4, 1994 and now abandoned.

BACKGROUND OF THE INVENTION

1. Field of the Invention

This invention relates to a double cylinder body and a manufacturing method thereof, more particularly, to an inside and outside cylindrical body each of which may define differing inner and outer diameters, and wherein the inside cylindrical body is connected to an inner circumference defined by the outside cylindrical body. The present invention can be effectively employed, for example, in a housing of a fan motor mounted on a vehicle and the like.

2. Description of the Related Art

In general, a housing of a fan motor mounted on an vehicle is required to be as light as possible from the point of view of improving fuel consumption and the like. A fan motor used on an engine radiator is required high to have radiating property.

A fan motor complying with the requirement is therefore proposed in the Japanese laying open of application No. 4-347548. In this fan motor, an iron-made yoke is connected to the inside of an aluminum-made housing, making it lightweight and the radiating property thereof is improved by using the aluminum-made casing.

When the iron-made yoke is connected to the inside of the aluminum-made housing, the connecting method is generally brazing, a rivet or the like is generally adopted.

However, in the case in which the housing is manufactured by brazing, a rivet or the like, the problems often occur.

(1) It is difficult to judge the connection between the yoke and the housing by a nondestructive inspection.

(2) The connecting step(s) step is(are) necessary as a special step, so that quantity production is prevented.

(3) A medium is necessary except for the connecting parts.

It has been considered to manufacture the housing by a connecting method such as caulking, or metal flow. However, the above problems (1) and the (2) remain in the connecting method of caulking, and the predetermination of the connecting strength is difficult. The above problems (1), (2) and (3) remain in a connecting method by metal flow.

That is to say, the problems as follows exist even using the above connecting method.

(a) It is difficult to verify all connections.

(b) It is difficult to determine the connecting strength.

(c) It is difficult to simplify the connecting steps.

SUMMARY OF THE INVENTION

It is an object of the invention to provide a double cylinder body and a manufacturing method thereof which can connect between an inside cylinder and an outside cylinder strongly.

So as to satisfy these objects, the present invention provides a double cylinder body wherein an outer circumferential face of an inside cylinder is connected to an inner circumferential face of an outside cylinder, the outside cylinder and the inside cylinder are connected to each other coaxially, the double cylinder body comprising:

the inside cylinder is formed into a cylindrical shape by rolling a rectangular plate so as to have a join;

an opening is formed at an outer circumferential side of one side of the join; and an extended portion is extending into the opening, which is formed at an outer circumferential side of the other side of the join by the ironing of the inside cylinder.

According to the present invention, the inside cylinder includes a stopper protruding outwardly from the outer circumference defined by the inside cylinder and is fit into a punch, which in turn is press fit into the outside cylinder press inserted in the outside cylinder. Next, the outside cylinder is press inserted in a concave portion of a die. Hereby, the inside face of the outside cylinder and the outside face of the inside cylinder are closely engaged with each other, and the accuracy of the outer face of the outside cylinder appears. After that, the punch is ejected from the inside cylinder during ironing the inside face of the die. Then, the punch is ejected from the inside of the inside cylinder because the friction resistance between the die and the outside cylinder is large, and the stopper of the inside cylinder operates as the stopper is ejected.

The accuracy of the inside face of the inside cylinder, and the extension toward the circumferential direction appears in the inside cylinder by the ironing of the punch.

Since the present invention is constructed as above, it is possible to establish the connection strength easily, and to check the connection easily by a nondestructive inspection. Further, it is possible to simplify the connecting operation, and to fix the inside cylinder to the outside cylinder strongly.

BRIEF DESCRIPTION OF THE DRAWINGS

In the accompanying drawings:

FIG. 1(a), FIG. 1(b) and FIG. 1(c) are perspective views showing a manufacturing method of a motor housing in accordance with an embodiment of the present invention;

FIG. 4(a) is a plan sectional view showings a fan motor,

FIG. 4(b) is a perspective view of a motor housing showings a fan motor.

DESCRIPTION OF THE PREFERRED EMBODIMENT

Figure 2A:
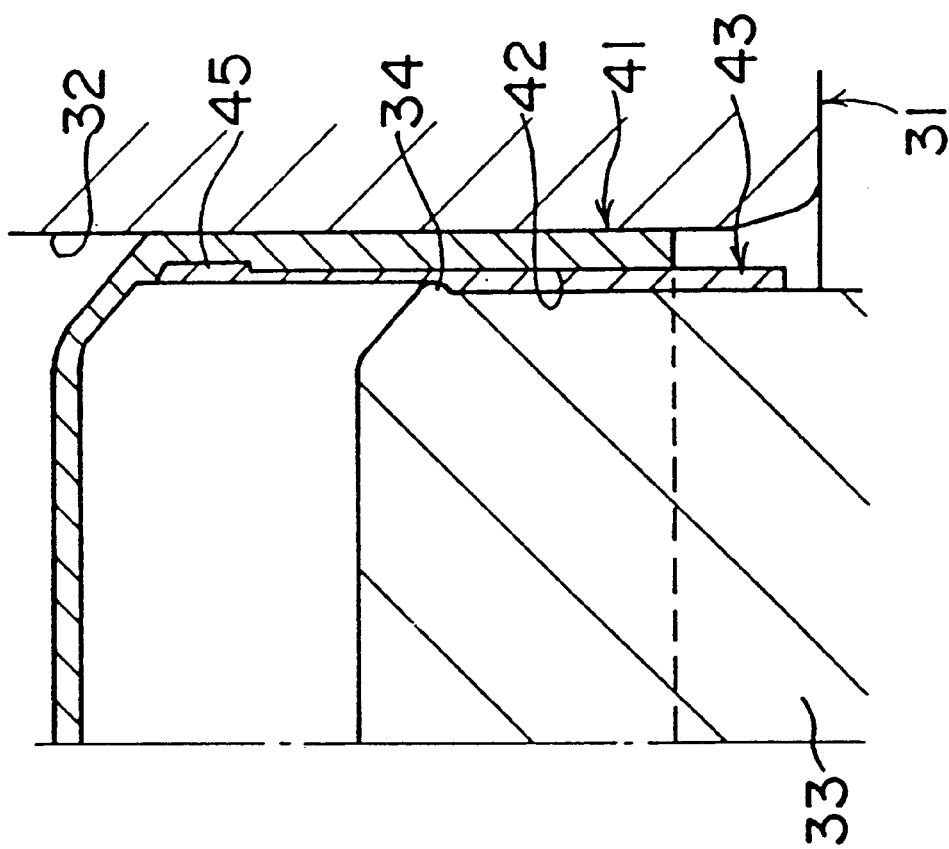
FIG. 2(a) and the FIG. 2(b) are enlarged partially sectional views showing the main steps of the method of FIG. 1.

In this embodiment, a double cylinder body in accordance with the present invention is constructed as a housing of the fan motor. The fan motor 9 is employed as an electrical equipment for a vehicle, which is provided with a casing 11, an end bracket 12, and a motor housing 10 which is comprised of a yoke 13.

The casing 11 which is made from aluminum is non-magnetic material, which is unitarily formed into a bowl-like shape by a hot forging. The end bracket 12 is fixed to an opening end of the casing 11, which closes thereon. The end bracket 12 is also made from aluminum. Aluminum is non-magnetic material, the specific gravity of which is small, and the thermal conductivity of which is high. Thus it is possible to realize the greater lightness of weight and the improvement of the radiating property of the fan motor.

A motor shaft 14 is rotatably fixed in the casing 11 so that one end thereof is supported by a bottom wall of the casing 11 and the other end thereof is supported by the end bracket 12 through bearings 15,16. A commutator 17, a brush 18 and a rotor 19 are arranged at an outer circumference of the motor shaft 14.

The yoke 13 is formed into a cylindrical shape by rolling a rectangular plate made from iron which is a ferromagnetic material. A clearance is therefore formed on the yoke 13 by a join thereof, which exists toward the axis direction of the yoke 13. However, in the motor housing 10 in accordance with the embodiment, the clearance of the yoke 13 will be in a removed state to disappear by a manufacturing method described hereinafter. Accordingly, the generation of an air-gap by the clearance on the magnetic circuit is evaded.

The yoke 13 is arranged on the inner circumference of the casing 11, and is fixed thereto by a connecting method described hereinafter. A magnet holder 21, a magnet pressure piece 22 and a magnet stopper 23 are arranged on the inside face of the yoke 13 toward the circumferential direction with equal spacing, four magnets 20 are respectively arranged between the magnet pressure piece 22 and the magnet stopper 23, and are fixed in the inside of the yoke 13 thereby. The magnetic circuit is formed by these 20 and the iron-made yoke 13. The air-gap is not generated on the magnetic circuit by the join.

Next, a manufacturing method of the double cylinder body in accordance with the present invention is described. In this embodiment, the manufacturing method is a manufacturing method for the motor housing 10 in which the yoke 13 is connected to the inside of the casing 11. The detail of the construction of the motor housing 10, which is one embodiment of the present invention, is also clarified by the description.

An outside cylinder 41 is a base of the casing 11, which is made from aluminum. The outside cylinder 41 is formed by a hot forging in advance. A die 31 for ironing and a punch 33 formed into an approximately cylindrical shape are prepared for sizing the dispersion of an outer diameter (A) of the outside cylinder 41 which is formed. A concave portion(female mold) 32 is provided in an opening manner with the die 31, in which the outside cylinder 41 is inserted. An inner diameter (B) of the concave portion 32 is predetermined so as to size the length the outer diameter (A) of the outside cylinder 41. The concave portion 32 is formed so as to insert a knock out pin (not shown) thereto through a perforation.

The outer diameter of a punch (male mold) 33 corresponds to the inner diameter of the yoke 13. A swelling portion 34 for sizing an inside cylinder 43 is protrudely provided on the outer circumference of the top end of the punch 33 so as to be ring shaped with a constant width and a constant height. The swelling portion 34 is the section formed into an arc-like shape, the dimension of the diameter direction (height) of which is predetermined to be extremely small.

On the other hand, a plate is cut into the predetermined dimension, which is made from ferromagnetic material. As shown in FIG. 1(*a*), the inside cylinder 43 is a base of the yoke 13, which is formed into a cylindrical body having a small diameter as compared with the outside cylinder 41 by rolling the plates so as to be approximately cylindrical shaped. A clearance 44 is provided with the inside cylinder 43 toward both ends of the axis direction along the total length. As described hereinafter, the height of the swelling portion 34 of the punch 33 is predetermined so as to correspond to the dimension of the clearance 44.

Further, a stopper 45 is unitarily provided on the outer circumference of the inside cylinder 43 so as to be approximately ring shaped. The stopper 45 can be formed by protrudely providing a step having a constant width and a constant height along the longitudinal side of one face of the plate before rolling into the inside cylinder 43. The stopper 45 can be also swelling formed by a plastic work after the plate is rolled into the inside cylinder 43.

Figure 3A:
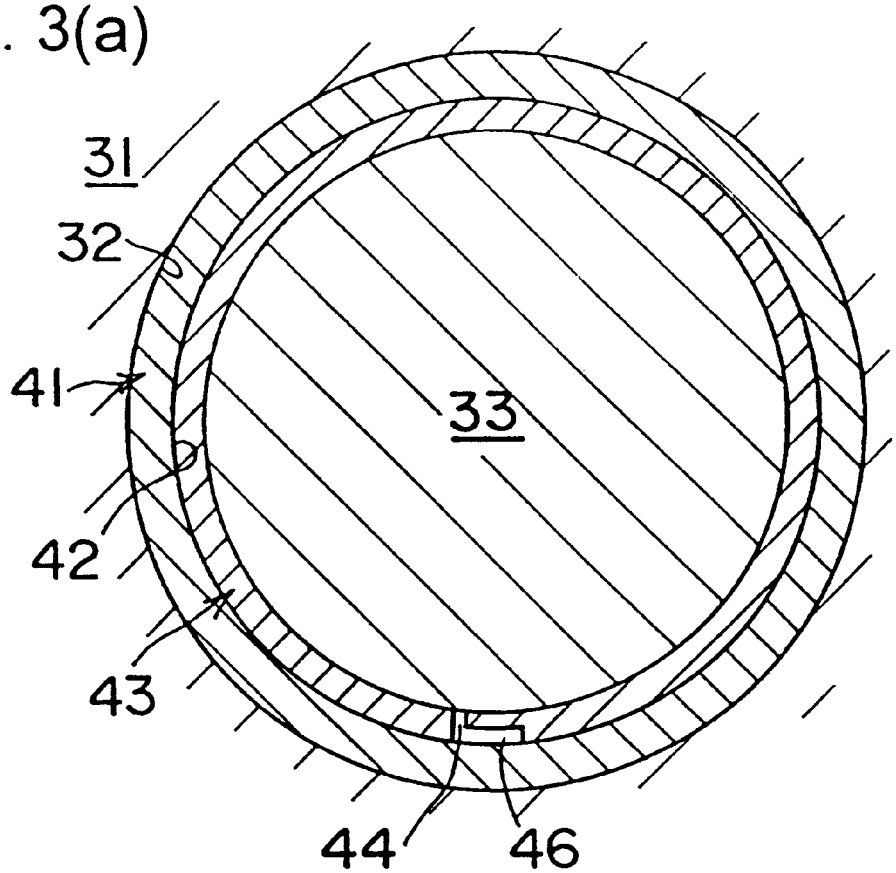
FIG. 3(a) and the FIG. 3(b) are plan views showing main steps.
Figure 3B:
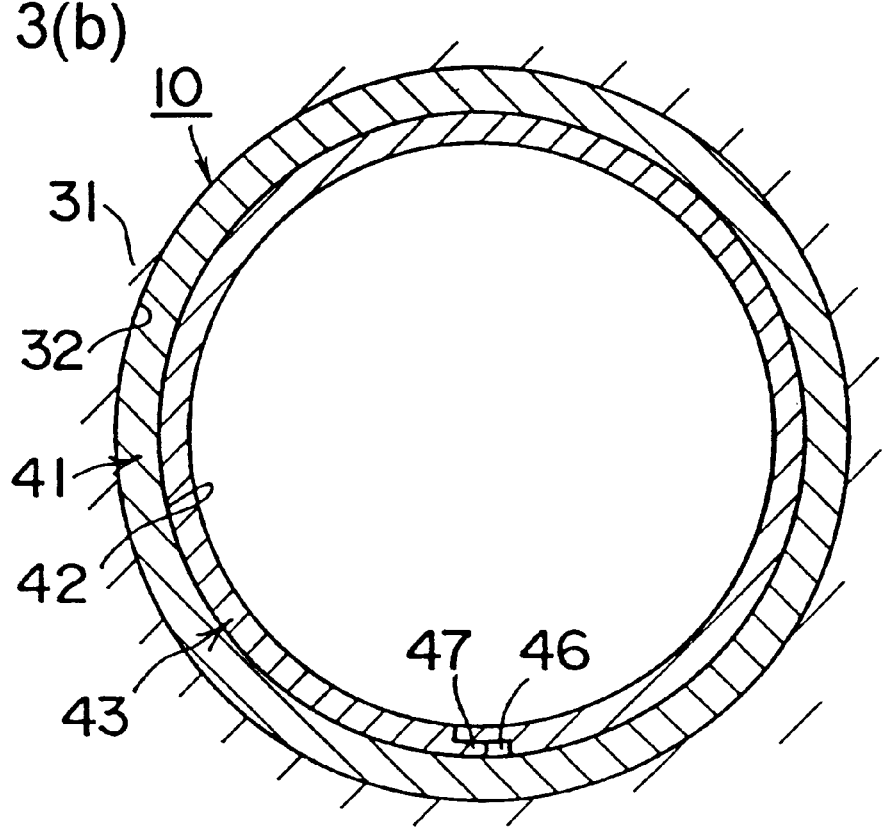

Furthermore, as shown in FIG. 3(*a*), an opening of recess 46 is provided on one end portion of the rolled plate so as to define a tongue 50 which extends toward the opposite end portion of the rolled plate or inside cylinder 43. The clearance 44 which is the join of the inside cylinder 43 exists between two end portions of the inside cylinder. The opening or recess 46 can be formed by a cutting work or a plastic work of one end portion of the plate before rolling into the inside cylinder 43.

The inside cylinder 43 provided with the stopper 45 and the opening 46 is, as shown in FIG. 1(*b*), fitted to the outer circumference of the punch 33. Then, the stopper 45 is faced toward the swelling portion 34 of the punch 33. The inside cylinder 43 is fitted so as to curl on the outer circumference of the punch 33 by elongating the diameter of the inside cylinder 43 so that the clearance 44 may be large.

In the state in which the inside cylinder 43 curls on the outer circumference, as shown in FIG. 1(*c*), the punch 33 is inserted to the predetermined position of a void 42 of the inside cylinder outside cylinder 41.

Figure 2B:
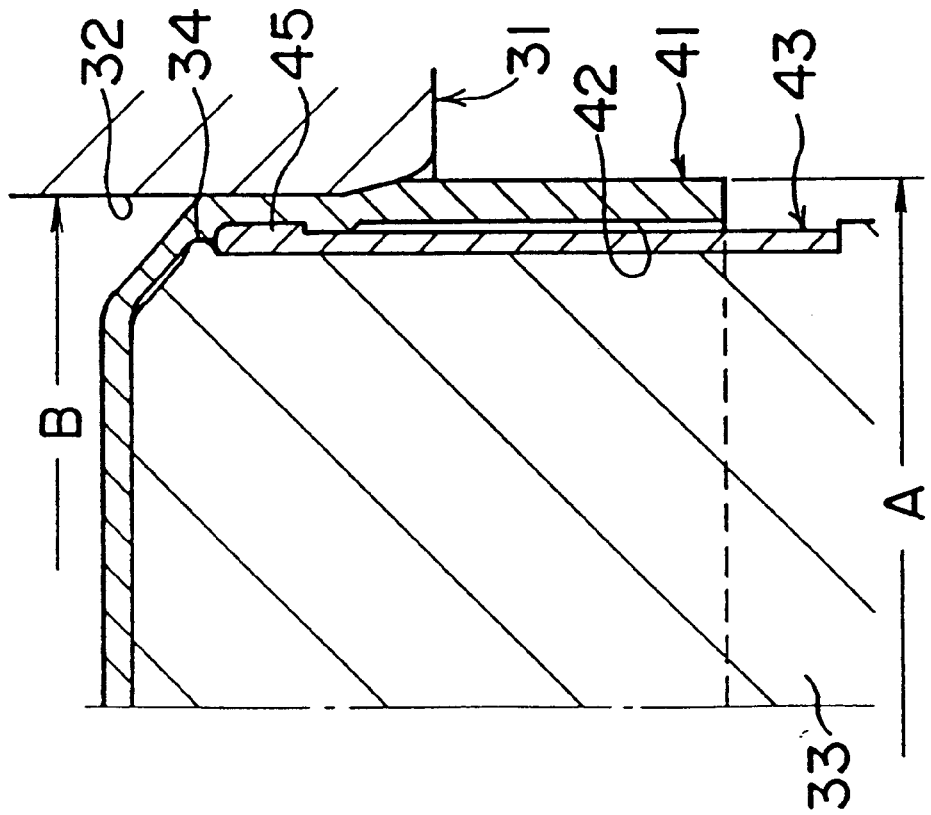

In the state in which the inside cylinder 43 is fitted in the punch 33, as shown in FIG. 1(*c*) and the FIG. 2(*a*), the outside cylinder 41 is press inserted in the concave portion 32 of the die 31 relatively. The outer diameter (A) of the outside cylinder 41 is sized into the dimension (B) predetermined by the inner diameter of the concave portion 32 by the press inserting of the outside cylinder 41 into the concave portion 32 of the die 31. With the sizing, one portion of the side wall of the outside cylinder 41 is in a state to press contact on the outer face of the inside cylinder 43 strongly by the plastic deformation toward the inside direction of the inside cylinder 43, the movement of which is prevented by the punch 33.

Next, when the punch 33 is ejected from the die 31 by the relative movement between the die 31 and the punch 33 toward the opposite direction, as shown in FIG. 2(*b*), the punch 33 is only ejected from the inside of the inside cylinder 43 during ironing the inside face of the inside cylinder 43 by the swelling portion 34; because the inside cylinder 43 is engaged to the outside cylinder 41 and the stopper 45 by the large friction resistance between the die 31 and the outside cylinder 41, and the relative movement between the die 31 and the punch 33 toward the opposite direction.

Then, the inside cylinder 43 extends toward the circumferential direction thereof by the ironing of the punch 33, so that the clearance 44 of the join is covered, the air-gap from the clearance 44 therefore is prevented. Further, both ends of the join are squeezed by the extending of the clearance 44 toward the circumferential direction thereof. Consequently, the inside cylinder 43 and the outside cylinder 41 are connected to each other by the press contact of the inside cylinder 43 on the inside of the outside cylinder 41 strongly and by the stopper 45 of the inside cylinder 43.

Furthermore, as shown in FIG. 3(*b*), one side, without the opening 46 of both sides of the clearance of the inside cylinder 43, is swelling deformed toward the opening 46 during ironing. Hereby, an extended portion 47, extending into the opening 46 from the outside of the diameter direction is formed. The ejection of the join 44 of the inside cylinder 43 toward the inside of the diameter direction is reliably prevented by the engagement of the extended portion 47 to the opening 46.

After that, the knock out pin is operated, the outside cylinder 41 connected to the inside cylinder 43 is ejected from the concave portion 32 of the die 31.

The motor housing 10 can be manufactured by the above steps, in which the yoke 13 without the clearance is connected to the inside of the casing 11.

As described above, according to the embodiment, it is possible to select optionally the connecting strength of between the inside cylinder 43 and the outside cylinder 41 in accordance with the height of the stopper 45 of the inside cylinder 43 and the height of the swelling portion 34 of the punch 33. It is also possible to ascertain the quality of the connection between the casing 11 and the yoke 13 by measuring the clearance 44 of the yoke 13 and the outer diameter (B) of the casing 11 after connecting.

That is to say, according to the embodiment, it is possible to establish the connecting strength easily and to ascertain the quality of the connection easily by a nondestructive inspection. It is possible to do the connecting operation between the casing 11 and the yoke 13 and the sizing of the dispersion of the outer diameter of the casing 11 simultaneously by a hot forging.

The present invention is not limited to this embodiment; in so far as the essence of the invention is not deviated from, it goes without saying that the present invention can be modified.

For instance, it is also possible to employ a cylindrical body, not limited to the inside cylinder formed by rolling a rectangular plate. In case of using the cylindrical body as the inside body, it is possible to fit the inside cylinder to the outer circumference of the punch easily by constructing the punch into a split punch.

The swelling portion for ironing the inside cylinder is not limited to a continuous ring shape, it can be formed into a ring shape with a break(s).

In the above embodiment, the motor housing is described, but the present invention is not limited thereto, it is possible to apply it to the whole of a double cylinder body of a rotor of a magneto generator and the like.

What is claimed is:

1. A method of manufacturing a double cylinder body comprising the steps of:

providing a first cylinder having an outer circumferential face defining an outer diameter, and an inner circumferential face defining an inner diameter;

providing a second cylinder having an outer circumferential face defining an outer diameter, an inner circumferential face defining an inner diameter, a wall having a thickness separating the outer circumferential face from the inner circumferential face, and an axial split extending along the entire axial length of the second cylinder and completely through the wall thickness, and wherein the second cylinder is a of a material harder than that of the first cylinder;

providing a punch having a circumferential swelling portion of a diameter greater than the inner diameter of the second cylinder;

providing a die having an internal circumferential face defining a diameter smaller than the outer diameter of the first cylinder;

inserting said punch into said second cylinder such that said swelling portion is located outside and adjacent to a first axial end of said second cylinder; then inserting said punch and said second cylinder into said first cylinder such that the outer circumferential face of the second cylinder is radially spaced from the inner circumferential face of the first cylinder; then forcing said punch, second cylinder and first cylinder into said die, thereby plastically deforming said first cylinder such that the inner circumferential face thereof becomes forced into engagement with the outer circumferential face of the second cylinder; then pulling said punch through said second cylinder such that said swelling portion travels from the first axial end of the second cylinder to and out of a second axial end thereof, whereby the wall thickness of the second cylinder becomes reduced, the outer circumferential face of the second cylinder is forced into further engagement with the inner circumferential face of the first cylinder, and portions of the second cylinder defining said axial slit deform circumferentially such that these portions become overlapped and close the axial slit.

2. The method according to claim 1, wherein the step of providing the second cylinder comprises the step of rolling a rectangular plate.

3. The method of claim 1, wherein the first cylinder further includes a closed axial end and the step of providing the first cylinder comprises the step of hot forging aluminum.

4. The method of claim 1, and further comprising the step of ejecting the first cylinder and the second cylinder as a unit form said die by forcing a knock out pin against the attached first and second cylinders.

5. The method of claim 1, wherein:

one portion of the second cylinder defining the axial slit includes a flat end face extending along the entire axial length of the second cylinder and having a radial thickness equal to the wall thickness; and another portion of the second cylinder defining the axial slit includes a first end face extending along the entire axial length of the second cylinder and having a radial thickness less than the wall thickness, and a second face, spaced circumferentially from the first end face, extending the entire axial length of the second cylinder and having a radial thickness less than the wall thickness; and wherein the overlapping of the portions and closing of the axial slit caused by said pulling step includes a first part of said flat end face being forced into engagement with said first end face, and a second part of said flat end face being plastically deformed circumferentially beyond said first end face toward said second face.

6. The method of claim 1, and further including the step of providing the outer circumferential face of the second cylinder with a circumferential protrusion, wherein said forcing and pulling steps cause circumferential protrusion to become embedded within the inner circumferential face of the first cylinder.

7. The method of claim 1, wherein said circumferential swelling portion is located at an axial end of said punch, and has a constant width and constant height.

* * * * *